Oct. 29, 1957 A. T. BALINT 2,811,689

MAGNETIC TRANSFORMER APPARATUS

Filed April 27, 1955 4 Sheets-Sheet 1

$|\bar{Z}_a - \bar{Z}_b| \cong |\bar{Z}'_a - \bar{Z}'_b|$

INVENTOR.
ANTHONY T. BALINT
BY
Beau, Brooks, Buckley & Beau,
ATTORNEYS.

INVENTOR.
ANTHONY T. BALINT
BY
Beau, Brooks, Buckley & Beau,
ATTORNEYS.

Fig. 9
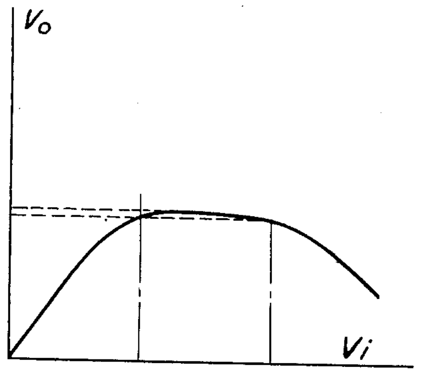
Fig. 10
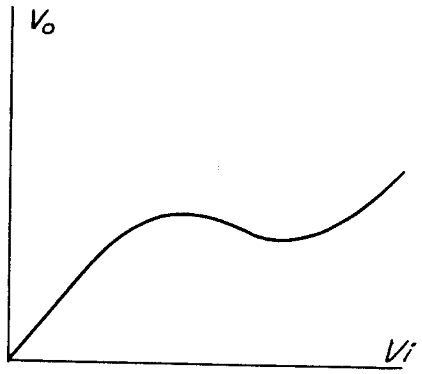
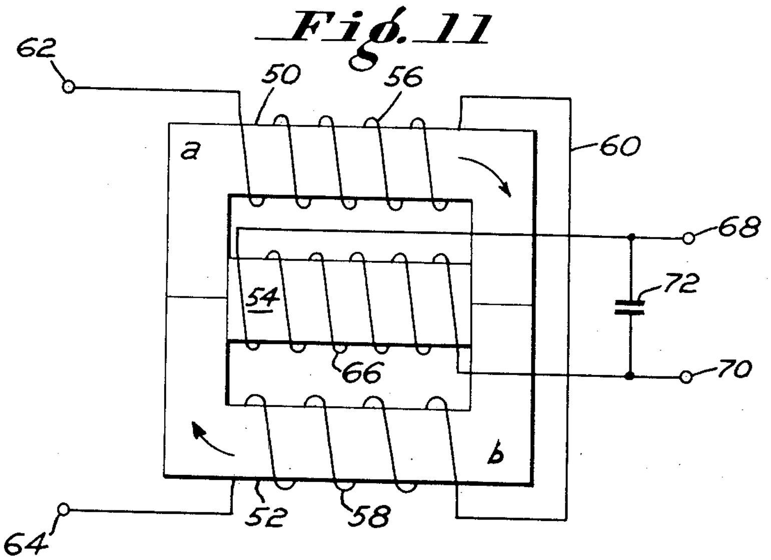
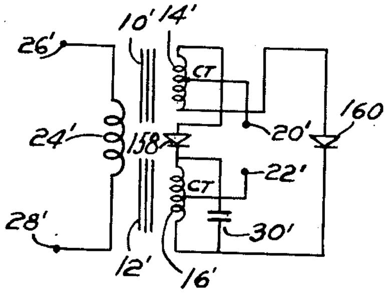
Fig. 15
INVENTOR.
ANTHONY T. BALINT
BY
Beau, Brooks, Buckley & Beau,
ATTORNEYS.

Oct. 29, 1957
A. T. BALINT
2,811,689
MAGNETIC TRANSFORMER APPARATUS
Filed April 27, 1955
4 Sheets-Sheet 4

INVENTOR.
ANTHONY T. BALINT
BY
Beau, Brooks, Buckley & Beau,
ATTORNEYS.

United States Patent Office 2,811,689

Patented Oct. 29, 1957

2,811,689

MAGNETIC TRANSFORMER APPARATUS

Anthony T. Balint, Snyder, N. Y.

Application April 27, 1955, Serial No. 504,263

20 Claims. (Cl. 323—48)

This invention relates generally to magnetic circuits and to devices using such circuits and more specifically to magnetic stabilizing devices and regulating devices, including error detecting means, such as may be used in magnetic amplifiers, oscillators and/or may comprise voltage or current regulating transformers, or other similar magnetic transfer devices, either with or without feedback.

The present application is a continuation-in-part of my copending application Serial No. 296,984 filed July 3, 1952, now abandoned.

This invention is based on the utilization of properly selected known dissimilar ferromagnetic or other magnetic core materials having different inherent magnetic properties, particularly wherein the B–H curves and/or hysteresis loops of the selected materials are inherently different to provide differently varying reluctance and/or core loss characteristics when subjected to correlated magnetizing conditions in an alternating current device in accordance with the invention, and preferably where the device includes an oppositely directed reactive loading means acting to stabilize the operation of the combination of core means as well as to filter the output.

As will appear more fully hereinafter, devices in accordance with the invention provide an output signal which is a predetermined function of the input signal. For example, the output voltage may be substantially constant over a range of input signal voltages, thereby providing a stabilized output directly. Further the operating characteristics of the device may be so chosen that negative regulation is obtained at a second range of input voltages continuing upwardly from the first mentioned range, thereby providing a voltage regulator with inherent self-protection against over-voltage. Alternatively the aforementioned second range of operation may be employed alone to provide an output inversely varying with variations in the input which is useful as a feedback signal or as a regulation providing component in an autotransformer or the like.

Prior art magnetic circuit devices for similar purposes generally provide a regulated output value by using a combination of core elements of the same material, one of which provides the useful output while the other is required for absorption of the error.

Such prior art regulating devices possess many disadvantages. In general they operate upon some variation of the principle that where there is a saturated core and an unsaturated core the voltage across the saturated core will be substantially constant, and accordingly the load is borne primarily or entirely by the saturated core, the unsaturated core merely absorbing the error or providing a small correction signal to compensate for the imperfect regulation provided by the saturated core. Thus the load is borne, in effect, entirely by one core, and consequently the devices are necessarily of a large size. Further, since the core materials are of the same inherent qualities, the devices inherently require assymetric component parts, which characteristic presents many manufacturing disadvantages particularly from the cost standpoint and results in a relatively complicated arrangement as compared to an ordinary transformer.

Accordingly it is an object of this invention to provide improved magnetic transfer devices as aforesaid which inherently provide differential performance characteristics which may be utilized to produce an output signal which will be a predetermined function of the input signal, due to the dissimilarity of the magnetic properties of the selected core materials.

Another object of the invention is to provide magnetic transfer devices as aforesaid embodying capacitance in parallel with variable inductance of the device in an improved ferro-resonant combination.

Another object of the invention is to provide improved electromagnetic devices which provide a flux difference characteristic which is substantially stable within an operational range of variation in the electrical input and/or output quantities, i. e. with variation of input voltage and also with variation in load.

Another object of the invention is to provide improved electromagnetic devices which provide a flux difference characteristic which is an inverse function of variation in the input voltage.

Still another object of the invention is to provide electromagnetic devices wherein the input current is stabilized with change of input voltage, so that the device may be used in series with a useful load as a current regulator.

An additional object of the invention is to provide devices as aforesaid wherein the core elements are physically symmetrical.

Another object of the invention is to provide magnetic circuit devices as aforesaid wherein the useful dissimilarity of magnetic response of the core materials employed derives from characteristics found in inexpensive available core materials, whereby no high cost materials, such as nickel alloys, are required.

A further object of the invention is to provide magnetic circuit devices as aforesaid which are relatively more efficient and simpler in construction than corresponding prior art devices, the devices being characterized by a high degree of useful or load bearing magnetization of all core elements, and having inherent filtering properties providing a substantially undistorted output wave shape.

Still another object of the invention is to provide devices as aforesaid providing a substantially smooth undistorted output signal of the same wave shape and frequency as the input signal.

Another object of the invention is to provide devices as aforesaid characterized by simplicity of the circuit arrangement whereby the input and output circuits are reversible, similarly to the reversibility of an ordinary transformer.

The aforesaid and other objects will become clearly apparent upon reading the ensuing detailed description taken together with the accompanying drawings, wherein:

Figs. 9 and 10 show curves representative of the relationship between the input voltage and the output voltage of the device of Fig. 5, where different combinations of core materials are employed.

Fig. 11 is a showing of a modified embodiment of the invention similar in operation to that of Fig. 5; and Figs. 12, 13, 14 and 15 are showings of arrangements embodying other aspects of the invention.

Figure 1:
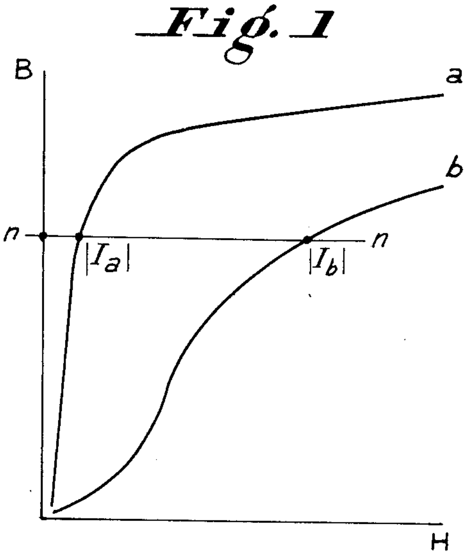
Fig. 1 is a B–H curve diagram representative of the relative B–H characteristics of two dissimilar materials which may be used in accordance with the invention.
Figure 2:
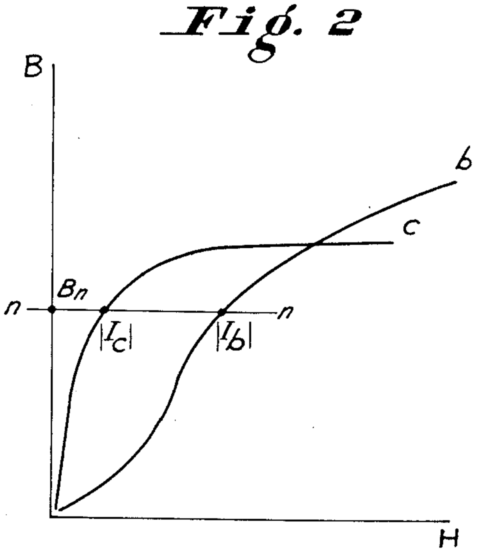
Fig. 2 is a diagram representative of the B–H curves another pair of dissimilar materials which may be used in accordance with the present invention.

The curves *a* and *b* of Fig. 1 approximate the respective A. C. characteristic magnetization curves of two preferred magnetic core materials suitable for use with the present invention, curve *a* being the B–H curve of low loss, high-permeability, cold-rolled, grain oriented silicon iron, and curve *b* being the B–H curve of ordinary transformer iron. Similarly, the A. C. characteristic magnetization curves of another pair of core materials which may be used in the practice of the invention are shown in Fig. 2, wherein the curves *b* and *c* approximate the B–H curves of ordinary transformer iron and of nickel-iron alloy, respectively.

Figure 3:
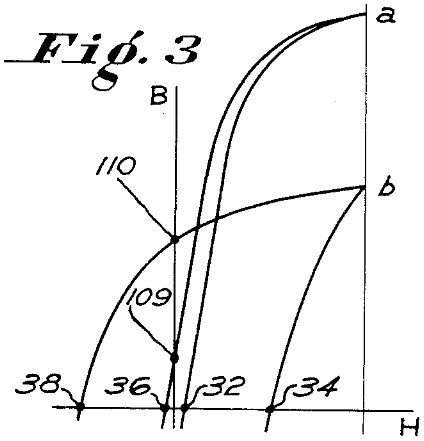
Figs. 3 and 4 are conventional hysteresis loop diagrams representative of the differing hysteresis loops of dissimilar magnetic core materials such as those having the differing B–H curves shown in Fig. 1 and Fig. 2, respectively.
Figure 4:
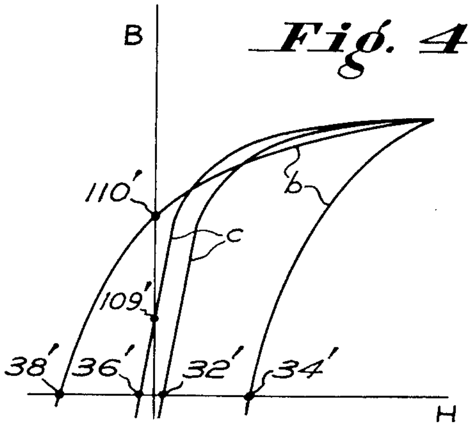

These pairs of materials are typical of many possible combinations of dissimilar core materials usuable in accordance with the invention, as will appear more fully hereinafter. The curves shown in Figs. 1 and 2 are A. C. curves, that is they are defined by the tips of the hysteresis loops resulting when the respective magnetic materials are subjected to various levels of A. C. magnetization. These hysteresis loops of the different materials are also dissimilar, in size, shape and attitude, and also in the way in which these qualities change with the corresponding A. C. magnetization level. For example, qualitatively representative hysteresis loops resulting from one level of A. C. magnetization force applied to the materials *a* and *b* of Fig. 1 are shown superimposed for comparison in Fig. 3, while a similar pair of loops characteristic of the materials *b* and *c* of Fig. 2 is shown in Fig. 4. The B–H curves and hysteresis loop characteristics of core materials can be determined experimentally by well-known test procedures, and such curves and characteristics of commercially available core materials suitable for use with the present may be found in publications such as techincal bulletins and catalogues of manufacturers of core materials, as will be referred to hereinafter.

Figures 5, 8:
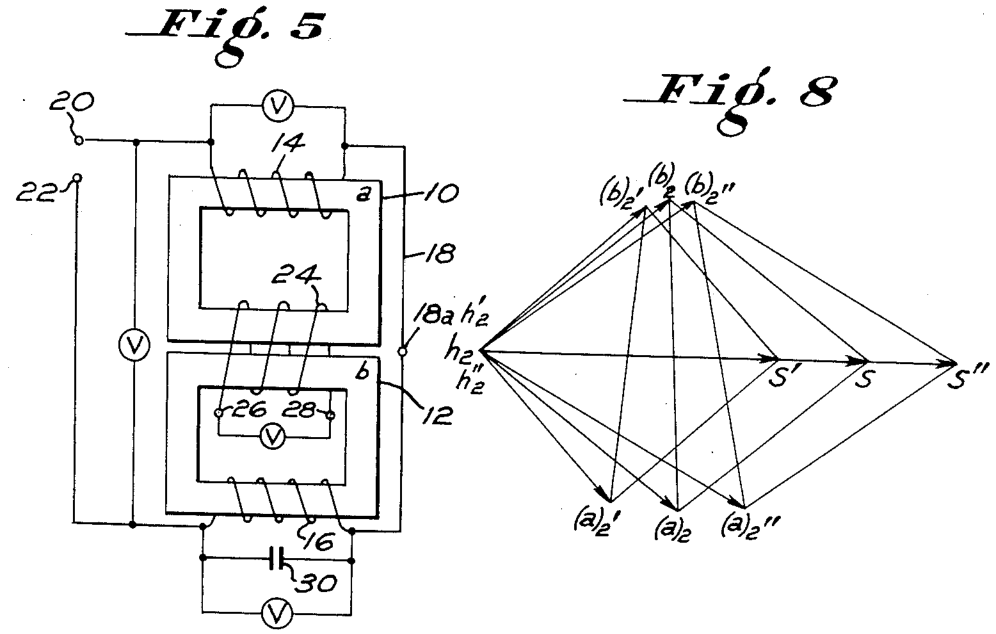
Fig. 5 is a diagrammatic showing of one core and circuit arrangement of the invention.
Fig. 8 is a vector diagram generally representative of relationships of the kind represented in Fig. 7.

Referring now to Fig. 5, a voltage regulating transformer in accordance with the invention may comprise a symmetrical core and winding arrangement of dimensionally identical cores 10, 12 of differing magnetic materials *a* and *b* such as those having the characteristics represented in Figs. 1, 3, or as will appear hereinafter, the cores 10, 12 may be of the materials *b* and *c* having relative characteristics of the general type illustrated in Figs. 2 and 4, where desired. As shown, the dissimilar material cores are wound with respective secondary windings 14, 16 of identical number of turns connected differentially in series by a conductor 18 across output terminals 20, 22, the device being provided with a common primary winding 24 having input terminals 26, 28. Preferably a condenser 30 is connected in parallel with winding means of the device in accordance with the invention such as across one of the secondary windings 16, as will appear more fully hereinafter.

The operation of the device of Fig. 5 will be considered first with reference to cores of materials *a* and *b* as referred to above, and temporarily neglecting the effect of the condenser 30. It will be seen that when a line voltage is impressed across the common primary winding 24, the resulting current will exert equal magnetizing forces (H) on the two cores 10, 12 and a corresponding flux (B, $\phi$) will be set up in each of the two cores as determined by the inherent magnetic qualities thereof as shown in part in Fig. 1.

It can be shown mathematically that the curve shown in Fig. 1 can be read as average magnitude of voltage vs. average magnitude of current with respect to each core individually; however, these curves do not show instantaneous time relationship and therefore are not representative of the difference in flux produced in the cores 10, 12 nor of the difference in voltage induced thereby in the secondary windings 14, 16 of the device. The non-linear functions involved in analysis of the operation of the invention are extremely complex and cannot be accurately described by the conventional analytical tools such as conventional graphical methods or the use of graphical or mathematical vector quantities. However it is possible to describe the relationship of the fluxes with reference to the several factors involved in their relationship to convey a qualitative understanding of the operation of the invention and as a guide in the practice thereof. Referring to Fig. 3 it will be seen that as two different core materials are subjected to the same alternating magnetic force or intensity H, the resulting fluxes of the two will go through zero point at different times 32, 34 and 36, 38, contributing as one factor in what will be called herein a "phase" difference in the two fluxes. However, since the hysteresis loops are non-linear and also dissimilar, the magnetizing current drawn by the primary winding 24, the individual flux wave shapes and induced voltage wave shapes (either counter E. M. F. or secondary) are not sinusoidal or alike, so that the word "phase" cannot be used in the usual sense as represented by a conventional rotating vector diagram, for example. However for qualitative purposes the word "phase" may be enlarged to include the difference in wave shape resulting from the non-linearities shown in Fig. 3 in the sense that the sum and difference of the fluxes will not be an arithmetic sum and difference of the two flux magnitudes separately averaged as readable on the curves of Fig. 1.

Figure 6:
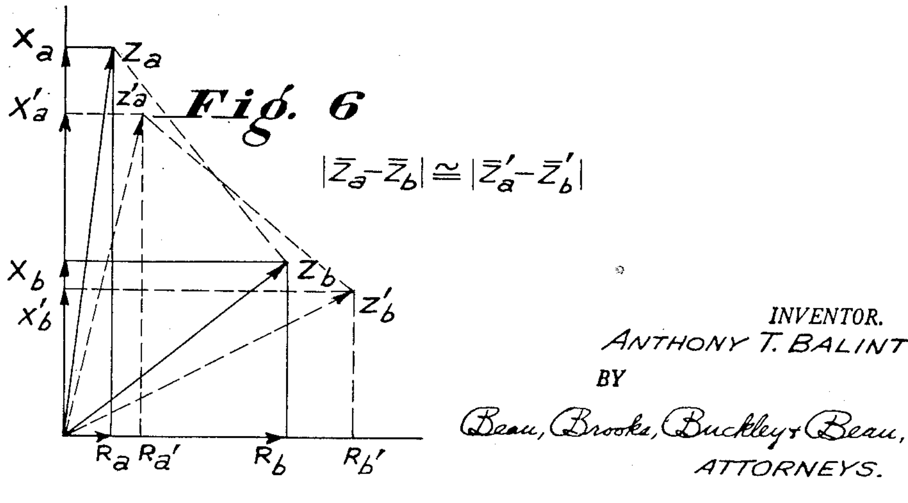
Fig. 6 is a diagram representing the differences in impedance presented by two core materials as utilized in the device of Fig. 5 in the conventional vector-diagram form.

It will be seen that major factors contributing to this "phase" difference are the shapes, and particularly the areas, of the respective hysteresis loops. These factors may be visualized in terms of the equivalent (linearized) inductive reactance and resistive (core loss) components of the impedance presented by the windings with respect to each core, as shown in Fig. 6. Referring again to Fig. 3 and to the operating H value shown therein, since the average permeability of the core material *a* and thus the average inductance of a coil wound thereon are higher than those quantities as determined by the core material *b*, the effective inductive reactance vector $X_a$ of Fig. 6 is shown larger than the corresponding vector $X_b$. Similarly since the area of the hysteresis loop *b* is greater than that of loop *a*, the equivalent resistance vector $R_b$ is shown larger than the corresponding vector $R_a$. When these vectors are combined as shown in Fig. 6, it will be seen that the resultant impedance vectors $Z_a$ and $Z_b$ differ in phase angle.

Another set of values marked with "prime" is shown representing conditions of a higher level of magnetization. Under certain conditions, as will be more fully described hereinafter, the values at this higher level of magnetization may be such that the vectorial difference from $Z_a$ to $Z_b$ remains substantially of the same magnitude, as from $Z'_a$ to $Z'_b$.

Another factor contributing to the "phase" difference in the magnetic response of the dissimilar core materials is believed to reside in the speed of response of the magnetic domains which is different for each material. Thus the manner in which the effects of the hysteresis loops are superimposed in operation of the device are further modified according to the different responses to the same magnetizing current. That is to say, aside from and in addition to the phasing due to the core losses, it is believed that the reactive components of the magnetizing currents applied to the two cores are out of phase, too.

Figure 7:
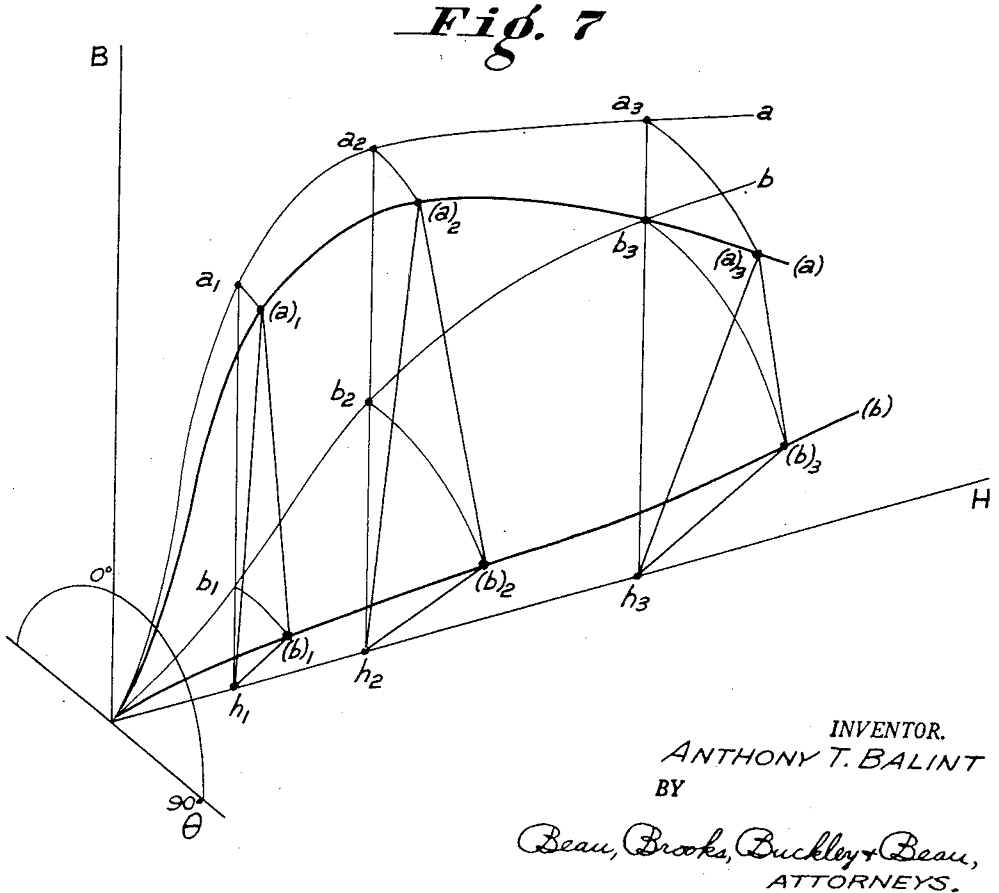
Fig. 7 is a three-dimensional way of describing the dynamic flux response of devices of the invention.

The foregoing several factors may be visualized in combination with reference to Fig. 7 wherein a third, polar coordinate theta ($\theta$) is added to a showing similar to that of Fig. 1, representative of the compound effect of the "phase" producing factors enumerated, the diagram showing the equivalent sinusoidal fluxes and the equivalent phase angle therebetween. These space curves may then be as rms curves, for example, the space difference between which is representative of the rms flux difference in two cores of materials $a$ and $b$ when subjected to a given magnetizing force in terms of rms current. For example, the piercing points $(a)_1$, $(a)_2$, $(a)_3$ and $(b)_1$, $(b)_2$, $(b)_3$ of the curves ($a$ )and ($b$) in planes perpendicular to the H axis through respective magnetizing force values $h_1$, $h_2$, $h_3$ are located in space to represent the magnitudes and relative phase relations of the fluxes set up in the two materials by the various magnetizing force values $h_1$, $h_2$, $h_3$. Accordingly the vector lines $h_1(a)_1$, $h_1(b)_1$, etc., represent the voltages induced by those fluxes, while $(a_1)(b_1)$, etc., represent the vector differences thereof.

Since the value of B for a zero value of H is necessarily zero for each of the curves ($a$) and ($b$), the curves each go to the B–H origin of the graphical showing of Fig. 7, and accordingly the difference flux or difference voltage at that point is necessarily zero. From this initial condition of coincidence the two dynamic phase related B–H curves are divergent as shown, curve ($a$) rising more rapidly than curve ($b$) on account of the relative shapes of the two B–H curves which govern the magnitude values as aforesaid, and the phase angle difference growing larger or at least being very substantial in this initial portion of the curves on account of the relatively high effective inductance presented by the material ($a$) and the relatively low inductance and higher core losses presented by the material ($b$). As shown in Fig. 1 as well as in the B–H plane of Fig. 7, the upper parts of the B–H curves $a$ and $b$ the two B–H curves become reconvergent beyond the knee of the last of the two materials to saturate, and in fact reference to manufacturer's published curves for these two types of materials show that they ultimately reach very nearly the same value of B. Accordingly, the effective inductances controlled by the two materials approach the same value, and at the same time since both materials are well above saturation, the values of the core losses, that is the area of the hysteresis loops, become more alike and therefore the effective resistances presented by the two materials become more alike. Accordingly, the "phase" angles of the two materials approach each other. This condition of decreasing difference in effective vector magnitude and angle is shown in Fig. 7 to result in the convergence of the two dynamic phase related B–H curves ($a$) and ($b$). Since the curves ($a$) and ($b$) are divergent from zero values of H and convergent with practical upper values of H and are smooth curves, it follows that there must be a region therebetween wherein the vector differences, that is the differences between piercing points of the two curves in planes perpendicular to the H axis, is substantially constant over a range of values of H. These relationships can be and have been experimentally shown and measured by instrumentation as shown in Fig. 5 using properly placed rms-voltmeters, or multiple-beam oscilloscopes.

Accordingly operation of the two core materials $a$ and $b$ with windings connected as shown in Fig. 5 will result in a rising differential output voltage as the input is raised from zero, followed by a region of substantially constant output voltage as the magnetizing current rises through intermediate values of H, and then passing into a region of decreasing differential output as the input voltage is raised still further.

The vector relationship for such intermediate values of H are represented qualitatively in Fig. 8 in somewhat more conventional form. In this figure it is seen that although the magnitudes of the two flux or voltage vectors of cores $a$ and $b$ are rising with rising values of input voltage and resultant rising values of H, the angle between the vectors is decreasing so that the difference of the vectors is substantially constant while the sum thereof $s'$, $s$, $s''$ representing the input voltage rises substantially. Again this is only an approximation because the non-linear fluxes actually existing cannot be represented in terms of rotating vectors which are valid only for sinusoidal quantities of a given frequency. However the two Figures 7 and 8 show how the resultant flux and resultant voltage is generated by the cooperation of the two fluxes but which differ in "phase" so that the differential output is of substantially constant magnitude as the magnitude of the sum of the two fluxes vary substantially. It should be noted that this "phase difference" rises from the nature of the materials themselves, the windings and dimensional relations of the device being entirely symmetrical.

It should be also noted that the "phase" difference between the two vectors results in a substantial output even if the vector magnitudes are of the same order. Referring now to Figs. 2 and 4 of the drawing, it will be observed that in the portion of the B–H curves of materials $b$ and $c$ where the two curves appear to intersect, there is a very substantial difference in the hysteresis loops of the two materials; for example, as shown in Fig. 4, the fluxes resulting when the two materials are subjected to the same alternating magnetic intensity (H) go through zero point at different times 32', 34' and 36', 38'. This is characteristic of materials which intersect in the practical range, such as the nickel alloy and ordinary transformer iron combination shown. Accordingly, Fig. 8 applies qualitatively to the situation where core materials $b$ and $c$ are used also, and to further illustrate this situation the vector magnitudes of Fig. 8 have been shown of substantially the same magnitude to indicate the manner in which the output of the electromagnetic arrangement of Fig. 5 when employing materials $b$ and $c$ would depend in the region of the intersection of the B–H curves more on the phase difference of the vectors than on the magnitudes thereof.

Fig. 8 shows also that the core elements are both contributing substantially to the output in contrast to prior art devices as aforesaid wherein the useful output is derived from one component alone making such prior devices relatively less efficient.

Accordingly materials may be chosen wherein the pattern of the phase difference variation and the pattern of magnitude difference variation of the two vectors varies in accordance with the output characteristics desired. It has been found experimentally that the output curve generally characteristic of combinations of materials such as $a$, $b$ is as shown in Fig. 9, wherein the output voltage $V_0$ first rises as the vector magnitudes rise with rising input voltage $V_i$, passes through a substantially constant portion as the diminishing phase angle begins to overcome the rising magnitude characteristic, and then passes into a region of diminishing output as both the phase angle difference and the magnitude difference diminish, as shown in the upper portion of the space curve diagram of Fig. 7.

Fig. 10 shows the manner in which the input $V_i$ versus output $V_0$ characteristic is changed by change of materials to those of $b$ and $c$, and in this figure it is shown that the initial portion of the curve is generally similar to that of Fig. 9, followed by a more or less of a shallow minimum portion wherein the vector magnitude difference is small or zero and phase difference is depended upon solely for the output as in the condition shown in Fig. 8, after which the output rises once again as the magnitude difference of the vectors rises rapidly beyond the intersection point of the two B–H curves.

It has been found that the level of output and the percentage regulation of the device of Fig. 5 together with the power factor thereof and the wave shape of the output thereof may be very materially improved by addition of a properly selected oppositely directed reactive load as shown in the figure. In the arrangement of this figure, a condenser is connected across a secondary winding of the device linking only one of the core elements directly, in this case across the winding 16, as was found to be preferred in one experimental model as described hereinafter. However, in other experimental models it was found to be preferable to employ the condenser across the high-permeability, low-loss core winding. It is believed that these differences in preference result from relative differences in sharpness of resonance characteristics imparted to the LC-combinations by individual differences in the particular combinations. It was found that the above beneficial effects were provided at least in some degree if capacitance were provided across any of the windings, except, of course, the full primary winding. Whichever winding is chosen (including a combination of coils or a special coil for this purpose or a coil including an auto-transformer-like extension for this purpose or the like), the value of the condenser is selected to provide resonance with this winding at the third harmonic of the input voltage.

While the mechanism of operation of the combination so provided is very complicated, it has been found experimentally that the third harmonic is effectively eliminated from the output, the level of output is raised and the output curve is flattened in the operative range. Accordingly the condenser functions as a third harmonic filter while still functioning as an oppositely directed reactive load providing improved stabilization by reason of ferro-resonance. It has been found and can be shown that the ferro-resonance at the third harmonic frequency operates to select the magnetization level so that the resonance will occur despite changes in the value of the condenser. In other words changes in the value of the condenser force changes in the fundamental frequency magnetization in such direction and to such a degree that an effective inductance is presented which will resonate with the condenser at the third harmonic. Therefore the condenser is a positively operating control of the operating range at the fundamental frequency even though the resonance is at the third harmonic whereat it performs its filtering function.

While the asymmetrical condenser arrangement of Fig. 5 is usually preferred for use in a voltage regulator device, the condenser may be connected symmetrically, as shown in Fig. 11 for example. Fig. 11 also illustrates a modified core arrangement of the invention wherein fluxes induced in two different core materials are combined differentially in a common core element to produce a differential flux therein. In the illustrated example of this type of arrangement, the magnetic transfer device comprises a symmetrical arrangement of dimensionally identical core legs 50, 52 of differing magnetic materials, such as the materials *a* and *b* having the characteristics represented in Figs. 1 and 3 for example, and a neutral or common core leg 54 of any suitable magnetic material. The dissimilar core material legs 50, 52 are provided with respective primary windings 56, 58 of identical number of turns connected in series by a conductor 60 across the input terminals 62, 64 of the device, and the differential flux carrying common core leg 54 is wound with a secondary winding 66 connected to the output terminals 68, 70 of the device as shown. It will be seen that the device as thus far described is in effect similar magnetically and electrically to the arrangement of Fig. 5; however in this case, the condenser 72 is connected across the differential output, that is across the winding 66 which in effect links the fluxes of both cores differentially, and is chosen to resonate at the third harmonic with the differential inductance provided by the flux response of the two materials *a* and *b* as linked by the common winding 66. With this arrangement, the condenser 72 performs the same functions as the condenser 30 of Fig. 5 and in addition it has been found that with this symmetrical arrangement of the condenser, a ferro-resonant "jump" effect is provided whereby the cores 50, 52 "jump" into stabilized operation only after magnetization to a point above the lower end of the regulated range, or at least near that lower end. Accordingly, this characteristic is sometimes restrictive of design for various operative ranges. However where this is not objectionable, the effect is actually beneficial and may be used in some cases to provide a triggering effect in relay applications.

It should be noted that the specific core, winding and condenser arrangements of Figs. 5 and 11 are for illustration of various possible arrangements only, and that a condenser could be connected symmetrically in the device of Fig. 5, such as across the output terminals 20, 22 thereof, or asymmetrically in the arrangement of Fig. 11, such as across one of the primary windings thereof.

In the devices thus far described, the magnetic response of the two dissimilar core materials has been compared by subjecting the two to the same magnetic intensity (H), so that magnetizing current is the common variable in the utilization of the two core materials. Alternatively voltage may be the common variable, and the magnetizing currents required to supply the counter E. M. F. generating flux for this voltage in the two core materials may be compared.

Figure 12:
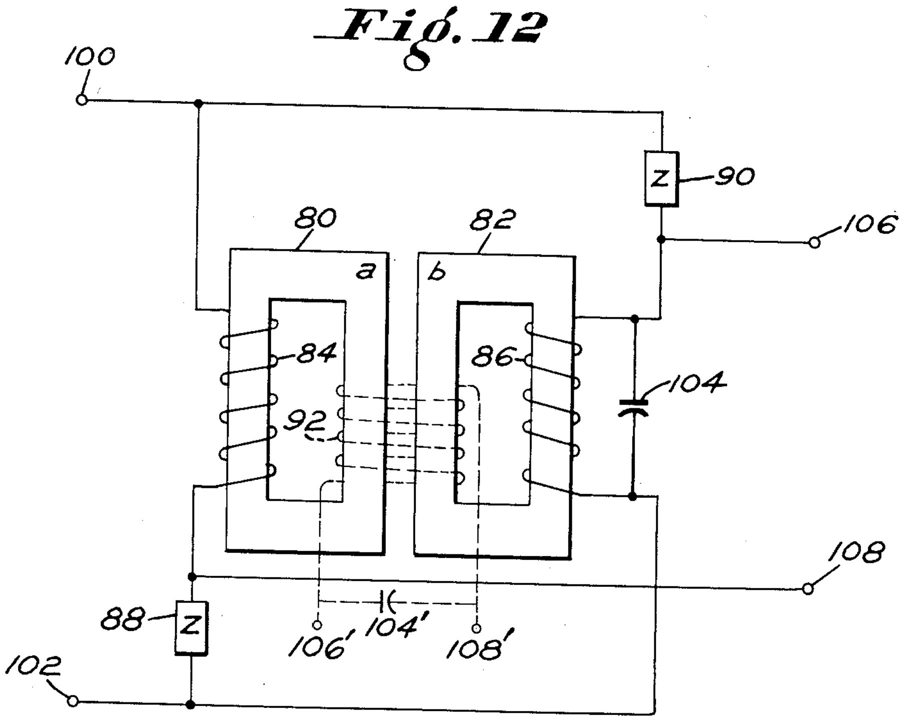

A device of this type in accordance with the invention is shown in Fig. 12, wherein a pair of cores 80, 82 which may be of the materials *a*, *b* previously described are provided with windings 84, 86, of identical number of turns, which are connected in series respectively with impedances 88, 90 of fixed value "Z" across input terminals 100, 102. Preferably a condenser 104 is connected across one of the windings 86 to resonate therewith at the third harmonic in the manner previously described.

As an alternative mode of operation of the device according to Fig. 12, it is provided with output coil 92, across both legs of the two cores sensing the instantaneous difference of the fluxes therein. In this case the output terminals become 106' and 108' and the electrical circuit arrangement becomes similar to that of Fig. 5 and Fig. 11, except for the input coils 84 and 86 being connected in parallel instead of in series across the input voltage. Condenser 104' represents a modification similar to Fig. 11 as mentioned before.

Referring again to Fig. 7, it will be seen that in order to represent the so-called "phasing" effects a third axis was introduced, resulting in the space curves (*a*) and (*b*) while the conventional B–H curves *a* and *b* were rotated out from their B–H plane. A somewhat similar reasoning and a different three-dimensional showing would apply to the devices as in Fig. 12, where the primary magnetizing coils are connected in parallel across the same input voltage. In such devices the amount of current necessary to establish the same flux $B_n$ (Figs. 1 or 2) in the different cores is different in magnitude and also in phase-relation due to the various phasing effects explained before. Thus as shown in Figs. 2 and 4 the magnetizing forces (H) required to provide a given alternating flux density (B) in materials *a* and *b* or *b* and *c* go through zero points at different times 109 and 110 or 110' and 109', respectively. Hence, the current values as shown in Fig. 1 and Fig. 2 by the intersecting lines *n*—*n*, corresponding to a given $B_n$ in each case are $I_a$ and $I_b$, and $I_b$ and $I_c$, respectively, and in order to represent their phase-relations, they should be rotated out of their B–H plane about the B axis according to a procedure similar to that shown in Fig. 7, in a plane which the lines *n*—*n* represent, seen edgewise in Figs. 1 and 2. The resulting points in space for various values of B define dynamic phase related B–H curves usable similarly to those of Fig. 7, except that in this case (B) voltage is the common variable instead of (H) or current. Accordingly, the voltage distribution among the parts 84, 88 and 86, 90 of the bridge-arrangement shown in Fig. 12 will depend upon the magnitudes and phase-relation of the currents drawn by the respective coils 84, 86, and this voltage distribution is detected at points between the respective fixed Z, and variable impedances as shown at output terminals 106, 108, or 106' and 108' respectively.

Figure 13:
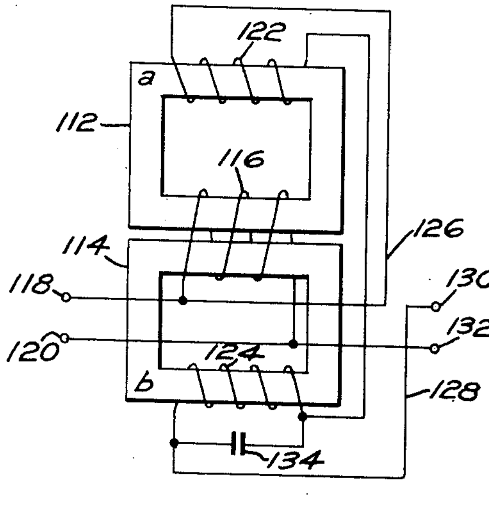

As previously stated, the devices of the invention can be designed to deliver output signals of a variety of functions of the input signal. For example, the output characteristic shown in Fig. 9 has a portion at the outer end of the curve shown in which the output varies inversely with changes in input. This characteristic is useful in that it makes the device self-protecting against over voltage since rising input voltage results in decreasing output voltage and thus decreasing load current. This characteristic is also useful as a source of negative feedback in a variety of applications such as oscillators and the like. One example of the utilization of this characteristic is shown in Fig. 13 wherein a magnetic transfer device of the general form of Fig. 5 is shown to have magnetic cores 112, 114 excited by a common primary winding 116 connected across input terminals 118, 120 and each having a secondary winding 122, 124 differentially connected as shown in series with the input line by conductors 126, 128 across output terminals 130, 132. As in the device of Fig. 5, a condenser 134 is preferably employed across one of the windings 124. It will be seen that in this arrangement the device operates as an auto-transformer in which the added voltage component has an inverse characteristic with respect to variations in input line voltage, which inverse variation can be predetermined to compensate for variations in the line voltage.

While materials of the type *a, b* providing output characteristics as shown in Fig. 9 are preferred for this auto-transformer application, it will be seen that the type combination of materials referred to hereinabove as *b, c* and providing a characteristic output curve shape as shown in Fig. 10 may be employed since an inverse variation is provided in the reverse portion of the curve shown in that figure.

Figure 14:
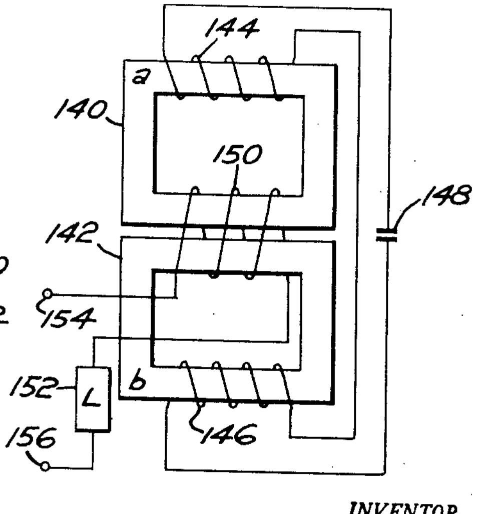

It has been found that the characteristic output curve shapes of Fig. 9 and Fig. 10 are generally valid not only for output voltage but also for input current and power for any given output load. Acccordingly, the devices of the invention are current and power regulating devices and may be employed specifically as such. For example, as shown in Fig. 14 a device of the general form of Fig. 5 having a pair of cores 140, 142 of dissimilar materials such as *a* and *b* are provided with secondary windings 144, 146 which are connected differentially across a condenser 148 selected to resonate at the third harmonic with the differential inductance thus presented at the operating point. Accordingly in this case the condenser performs the function of a fixed load as well as the functions previously described. As shown, the device is provided with a primary winding 150 common to the two cores, which is connected in series with the useful load 152 across line terminals 154, 156. In lieu of the symmetrical position of the condenser shown, a condenser in accordance with the invention could be connected across one winding 146 as in the arrangement of Fig. 5, and the fixed secondary load could be provided simply by the resistance of the windings connected differentially in a short circuited loop. With either arrangement, the device operates to regulate the current passing through the primary winding 150, which same current passes through the useful load 152.

As an additional output signal source, or in lieu of the output circuits shown, output terminals may be provided if desired across a secondary winding linking the flux of the more saturated of any of the cores of the foregoing devices. When well above saturation, it will be understood that the magnitude of this flux changes but little, and the effect of the condenser is to further restrict any such change.

In designing devices in accordance with the invenion, the two core materials are considered and selected first by considering their B–H curves and a pair is selected wherein one has high permeability and the other has low permeability. This is a trade term which refers to the slope of the initial part of the B–H curve. This results in substantially different hysteresis loops at the lower parts of the curves. For this purpose the A. C. B–H curves are used if available, otherwise the D. C. provide a good approximation. These curves are then considered together with the corresponding hysteresis loops to visualize or actually make a three-dimensional model of the kind shown in Fig. 7. Then the selection of the pair of materials is influenced in favor of a pair which will have widely different and favorably changing core losses (i. e. hysteresis loop areas) in the region of possible operation which includes the spreading, the quasi-parallel and the converging regions of the three-dimensional representation, the relative parts on the two curves being those which represent common magnetic intensities, or in the design of the device of Fig. 12, common flux densities.

Since the model already shows the B and H values in the selected range, the considerations of lamination size and number of turns are the same as for any transformer design. In this connection attention is directed to Fig. 8 which is what a plot would look like on the planes which are perpendicular to the H axis of the three-dimensional model showing vectors from that axis to the two three-dimensional B–H curves, and their difference (output), and their sum (line voltage). In other words the transformer is designed to the primary requirements of line voltage which dictates an inter-dependent number of primary turns and cross-sectional area of core, the selection being such that the desired H results. This then gives a differential flux represented by the space difference of the curves at that H and this flux is converted into any differential output voltage by simply adding or removing secondary turns.

It will be noted that thus far the condenser has been ignored. A condenser is now selected to resonate with the respective inductance at the third harmonic at the selected H. This can be done experimentally. It is noted that although the condenser was ignored in the design of the cores and the number of turns, it in fact opens up the phase difference of the primary vectors as shown in Fig. 8 with the result that the output is greater. Now when the condenser is added it forces the two primary voltage vectors further apart in phase. Since these two vectors must add up to the line voltage, they must now be longer. To be longer they must be the result of operating higher on their respective B–H curves. To be higher H must be higher, in other words more magnetization current will be drawn from the line. Therefore, this addition of the condenser moves the H plane corresponding to the nominal voltage from the design point outwardly along the three-dimensional model. Therefore the condenser is a second instrument for determining the nominal operating range, that is the H plane at rated input voltage. Since it appears that the condenser always raises the H plane at rated voltage, then the design before the condenser is considered ought to be somewhat on the low side of the desired point of the three-dimensional model. As a practical matter the value of the condenser may be determined experimentally by use of an oscilloscope, which will show the disappearance of third harmonic distortion when the L–C combination is at resonance.

Published B–H curves and core loss data of core materials suitable for use with the present invention may be found in publications such as Technical Bulletins EM–16 and EM–21 of the Allegheny Ludlum Steel Corp., Pittsburgh, Pennsylvania, Engineering Manual No. 3 of the United States Steel Corp., "Magnetic Materials" (Lecture 7, May 26, 1954) of Magnetic Metals Company, Camden, New Jersey, Bulletin No. L–752 of Thomas & Skinner Steel Products Company, Indianapolis, Indiana, and others.

It should be noted that materials are "dissimilar" within the meaning of the present specification and claims when employed in different manners with respect to physical properties of the materials having directional attributes. For example the grain oriented silicon steel referred to hereinabove as material *a* may be used in one core arranged so that the grain orientation is predominantly parallel to the flux lines, and in the other core so as to be predominantly transverse to those lines. Anything which will produce a difference in operating unit characteristics may be considered the basis of dissimilarity. As one specific example illustrating the method of design and employment of dissimilar materials in accordance with the invention a device in accordance with Fig. 5 may have the following specifications:

Lamination size: Allegheny-Ludlum UI–BJ (Cat. EM3, p. 56).
Core (each) 3 in. x 5 in. over all.
Core legs each 1 in. wide x 1½ in. deep.
Core material *a*: USS–80 Silectron.
Core material *b*: Ordinary transformer "C."
Coil 24: 200 turns, #16E wire.
Coils 14, 16: 1000 turns each, #23E wire.
$V_i = 115 \pm 15$ volts.
$V_0 = (375+375) \pm 2\%$ (i. e. $750 \pm 2\%$ where not center tapped).
$C = 4$ micro-farads.
Rated load 250 watts.
Total weight: approx. 11 lbs.
Wave-distortion: less than 3%.

In the various circuit arrangements shown and described in detail herein, the condenser has been shown connected in parallel with the inductance with which it cooperates, and accordingly operates to eliminate the frequency component at which the combination resonates. However, if desired a series connection of the condenser may be employed, in either the primary or secondary circuits or both, so as to reinforce the particular frequency component desired by means of series resonance at that frequency. In either case or both the ferro-resonant stabilizing effect is present, as well as the phase spreading, output raising effect.

Also in the illustrated devices as described above, the condenser value has been shown to provide resonance at the third harmonic frequency so as to suppress distortion components of that and higher frequencies to provide a substantially smooth sinusoidal output at the fundamental (input) frequency. However, the ferro-resonant combination as described lends itself to selection of operating values whereby the fundamental frequency component is suppressed and a predetermined sub-harmonic or harmonic frequency component becomes predominant to provide a frequency change having the other characteristics of the total combination as aforesaid.

It has been found that the differential output characteristics (e. g. stabilized output) of the devices of the invention are present in the flux relationships themselves, so that any number of additional secondary windings, arranged similarly to the secondary windings shown in the various figures, may be employed, each such additional winding providing a similar output characteristic at various desired voltages. Also since each secondary winding is electrically separate from every other and from the primary, any or all of them can be symmetrically center-tapped.

In addition to the embodiments described in detail herein, the teachings of the invention lend themselves to employment in a number of other types of device, for example in frequency changers as referred to above.

Also, in a magnetic amplifier, usually built with two symmetrically arranged saturable core elements, the invention enables the elimination of an external reference quantity for error detection, for example by providing a region of operation with a substantially stable differential characteristic.

Further, as mentioned above, the non-linear nature of the device with its "jump" effect lends itself to be used in a relay for providing a snap-action usually found in step-by-step regulator devices. As aforesaid, it has been found that symmetrical condenser ararngements provide a relatively sharp jump effect particularly useful for this purpose; however the effect is found in varying degrees in the other arrangements also.

Additionally, it will be seen from the showings of Figs. 1, 2 and 7 that the impedance values are such that in a selected region the differential permeabilities and the corresponding impedances have a so-called "negative-impedance" character. This can be used in an oscillator arrangement with feed back. Another employment of the invention is seen in Figs. 5 and 8 where the input voltage is split into two components of substantially equal magnitude and of the same magnitude as the input voltage which results in a so-called open-V connected 3-phase system derived from the single-phase input, using terminals 20, 22 and 18*a* as the three terminals for the open-V. Also the stabilizers described are advantageously combined with rectifier arrangements providing for compensation of undesirable voltage drops of such rectifier elements. As shown in Fig. 15, electromagnetic arrangements of the invention may be utilized to advantage to supply a rectifier. In that figure, an arrangement including cores 10′ and 12′ wound with a common primary 24′ and differential secondaries 14′, 16′, and a condenser 30′, similar to that of Fig. 5 for example, is shown, with the secondaries connected in a bridge arrangement with rectifier elements 158, 160, the output being taken at terminals 20′, 22′ across center-taps in the secondaries.

In each case, the employment of the invention results in a new effect resulting from the total combination including the non-linear elements.

Accordingly, while only a few embodiments of the invention have been illustrated and described in detail it will be understood that the invention may be otherwise embodied with its spirit and the scope of the appended claims.

What is claimed is:

1. In a voltage regulator apparatus, a pair of magnetic core means comprising dissimilar core materials having substantially different hysteresis loops for low levels of magnetization and more similar hysteresis loops for high levels of magnetization, input circuit means adapted to be connected to an alternating electric signal source and comprising magnetic intensity applying means adapted to magnetize said core means in accordance with the alternating signal, and output circuit means adapted to be connected to a load and responsive to the magnetic response of said core means comprising the hysteresis response of said core means by and upon such magnetization.

2. In a signal amplitude regulator apparatus, a pair of magnetic core means comprising dissimilar core materials having substantially different hysteresis loops for low levels of magnetization and more similar hysteresis loops for high levels of magnetization, and core employment means comprising winding means, said employment means comprising magnetic intensity applying means magnetizing said core means in accordance with an alternating signal and means responsive to the magnetic response comprising the hysteresis response of said core means by and upon such magnetization, and capacitor means connected in parallel with at least a portion of said winding means and resonant therewith at a harmonic frequency for altering the flux linked thereby.

3. In a magnetic apparatus, a pair of magnetic core means comprising dissimilar core materials having substantially different hysteresis loops for low levels of magnetization and more similar hysteresis loops for high levels of magnetization, and core employment means comprising winding means, said employment means comprising magnetic intensity applying means magnetizing said core means in accordance with an alternating signal and means responsive to the magnetic response comprising the hysteresis response of said core means by and upon such magnetization, and capacitor means connected in circuit with at least a portion of said winding means and co-operating resonately therewith to form an output filtering combination therewith.

4. In a static voltage regulator apparatus, a pair of magnetic core means comprising dissimilar core materials having substantially different hysteresis loops for low levels of magnetization and more similar hysteresis loops for high levels of magnetization, and core employment winding means comprising primary winding means adapted to be connected to a source of alternating potential and to magnetize said core means in accordance therewith and differential secondary winding means adapted to be connected to a load and responsive to the differential magnetic response including the hysteresis response of said core means to said employment means, and condenser means in circuit with said employment means arranged and adapted to modify said magnetic response to provide a combined response, said combined response providing a substantially stable induced voltage in said secondary winding means with variation in voltage applied to said primary winding means and with variation in load impedance across said secondary winding means.

5. In an electromagnetic apparatus for energizing a bridge type rectifier apparatus, a pair of magnetic core means comprising dissimilar core materials having substantially different hysteresis loops for low levels of magnetization and more similar hysteresis loops for high levels of magnetization, and core employment means comprising winding means, said employment means comprising magnetic intensity applying means magnetizing said core means in accordance with an alternating signal and means responsive to the magnetic response including the hysteresis response of said core means by and upon such magnetization, said winding means comprising output coil means substantially symmetrical with respect to said pair of core means and center tapped with respect to each core means for supplying power to the rectifier apparatus.

6. In a magnetic amplifier apparatus, saturable reactor means providing inherent reference quantities, said reactor means comprising a pair of magnetic core means comprising dissimilar core materials having substantially different hysteresis loops for low levels of magnetization and more similar hysteresis loops for high levels of magnetization, and core employment means comprising winding means, said employment means comprising magnetic intensity applying means magnetizing said core means in accordance with an alternating signal and means responsive to the magnetic response comprising the hysteresis response of said core means by and upon such magnetization, and direct current control winding means linking said core means.

7. In a frequency changer apparatus, a pair of magnetic core means comprising dissimilar core materials having substantially different hysteresis loops for low levels of magnetization and more similar hysteresis loops for high levels of magnetization, and core employment means comprising winding means, said employment means comprising magnetic intensity applying means magnetizing said core means in accordance with an alternating signal and means responsive to the magnetic response comprising the hysteresis response of said core means by and upon such magnetization to provide a signal potentially comprising a plurality of frequencies, and filter means connected to discriminate in favor of a predetermined one of said frequencies.

8. In a phase converter apparatus, a pair of magnetic core means comprising dissimilar core materials having substantially different hysteresis loops for low levels of magnetization and more similar hysteresis loops for high levels of magnetization, and core employment means comprising winding means, said employment means comprising magnetic intensity applying means magnetizing said core means in accordance with an alternating signal and means responsive to the magnetic response including the hysteresis response of said core means by and upon such magnetization, said winding means comprising a winding having separate differentially connected coils linking the two core means, and poly-phase terminals at the opposite ends of said coils and therebetween.

9. In an oscillator type magnetic device, magnetic apparatus comprising a pair of magnetic core means comprising dissimilar core materials having substantially different hysteresis loops for low levels of magnetization and more similar hysteresis loops for high levels of magnetization, and core employment means comprising winding means, said employment means comprising magnetic intensity applying means magnetizing said core means in a saturated region thereof in accordance with an alternating signal of rated input range and means responsive differentially to the magnetic response comprising the hysteresis response of said core means by and upon such magnetization, said magnetic apparatus providing negative impedance characteristics derived from the differential characteristics of the two core means in said saturated region of operation.

10. In combination with a rectifier, an energy supply for said rectifier comprising a pair of magnetic core means comprising dissimilar core materials having substantially different hysteresis loops for low levels of magnetization and more similar hysteresis loops for high levels of magnetization, and core employment means comprising winding means, said employment means comprising magnetic intensity applying means magnetizing said core means in accordance with an alternating signal of a rated range and means responsive to the magnetic response including the hysteresis response of said core means by and upon such magnetization adapted to provide an output rising at a rate less than the corresponding rise in said input signal within said rated range adapted to offset internal voltage drops in said rectifier.

11. In a voltage regulator apparatus, a pair of magnetic core means comprising dissimilar core materials having substantially different hysteresis loops for low levels of magnetization and more similar hysteresis loops for high levels of magnetization and dissimilar non-intersecting B–H curves, input circuit means adapted to be connected to an alternating electric signal source and comprising magnetic intensity applying means adapted to magnetize said core means in accordance with the alternating signal, and output circuit means adapted to be connected to a load and arranged to be responsive to the relative magnetic response of said core means comprising the B–H response and the hysteresis response of said core means by and upon such magnetization.

12. In a voltage regulator apparatus, a pair of magnetic core means comprising dissimilar core materials having substantially different hysteresis loops for low levels of magnetization and more similar hysteresis loops for high levels of magnetization and dissimilar non-intersecting B–H curves, input circuit means adapted to be connected to an alternating electric signal source and comprising magnetic intensity applying means adapted to magnetize said core means in accordance with the alternating signal, ferro-resonating means comprising winding means linking at least one of said core means and condenser means connected across said winding means to form a stabilizing and filtering combination therewith, and output circuit means adapted to be connected to a load and arranged to be responsive to the relative magnetic response of said core means comprising the B–H response and the phasing response of said core means by and upon such magnetization.

13. In a voltage regulator apparatus, a pair of magnetic core means comprising dissimilar core materials having substantially different hysteresis loops for low levels of magnetization and more similar hysteresis loops for high levels of magnetization, input circuit means adapted to be connected to an alternating electric signal source and comprising magnetic intensity applying means adapted to magnetize said core means in accordance with the alternating signal, ferro-resonating means comprising winding means linking at least one of said core means and condenser means connected across said winding means to form a stabilizing and filtering combination therewith, and output circuit means adapted to be connected to a load and arranged to be responsive to the relative magnetic response of said core means comprising the phasing response of said core means by and upon such magnetization.

14. In a voltage regulator apparatus, a pair of magnetic core means comprising dissimilar core materials having substantially different hysteresis loops for low levels of magnetization and more similar hysteresis loops for high levels of magnetization and dissimilar B–H curves, input circuit means adapted to be connected to an alternating electric signal source and comprising magnetic intensity applying means adapted to magnetize said core means in accordance with the alternating signal, ferro-resonating means comprising winding means linking at least one of said core means and condenser means connected across said winding means to form a stabilizing and filtering combination therewith, and output circuit means adapted to be connected to a load and arranged to be responsive to the relative magnetic response of said core means comprising the B–H response and the phasing response of said core means by and upon such magnetization.

15. A voltage regulator apparatus comprising a pair of gapless cores of ferro-magnetic material and of the same dimensions, primary winding means having a series current path adapted to be connected to a source of exciting voltage of a predetermined frequency and linking said cores substantially symmetrically, and secondary winding means having a series current path adapted to be connected to a load to provide a substantially constant output thereto with variations in said exciting voltage, said secondary winding means linking said cores substantially equally and differentially, said regulator including a resonating winding means on one of said cores only and a condenser connected thereacross, said condenser being of a value to provide ferro-resonance with said resonating winding means to form a distortion filtering combination therewith.

16. A voltage regulator apparatus comprising a pair of gapless cores of ferro-magnetic material and of the same dimensions, primary winding means having a series current path adapted to be connected to a source of exciting voltage of a predetermined frequency and linking said cores substantially symmetrically, and secondary winding means having a series current path adapted to be connected to a load to provide a substantially constant output thereto with variations in said exciting voltage, said secondary winding means linking said cores substantially equally and differentially, said regulator including a resonating winding means on one of said cores only and a condenser connected thereacross.

17. A voltage regulator apparatus comprising a pair of gapless cores of ferro-magnetic material and of the same dimensions, said cores being of materials having non-intersecting B–H curves, primary winding means having a series current path adapted to be connected to a source of exciting voltage of a predetermined frequency and linking said cores substantially symmetrically, and secondary winding means having a series current path adapted to be connected to a load to provide a substantially constant output thereto with variations in said exciting voltage, said secondary winding means linking said cores substantially equally and differentially, said regulator including a resonating winding means on one of said cores only and a condenser connected thereacross.

18. A voltage regulator apparatus comprising a pair of gapless cores of ferro-magnetic material and of the same dimensions, said cores being of dissimilar materials, primary winding means having a series current path adapted to be connected to a source of exciting voltage of a predetermined frequency and linking said cores substantially symmetrically, and secondary winding means having a series current path adapted to be connected to a load to provide a substantially constant output thereto with variations in said exciting voltage, said secondary winding means linking said cores substantially equally and differentially, said regulator including a resonating winding means on one of said cores only and a condenser connected thereacross.

19. A voltage regulator apparatus comprising a pair of gapless cores of ferro-magnetic material and of the same dimensions, said cores being of dissimilar materials having non-intersecting B–H curves, primary winding means having a series current path adapted to be connected to a source of exciting voltage of a predetermined frequency and linking said cores substantially symmetrically, and secondary winding means having a series current path adapted to be connected to a load to provide a substantially constant output thereto with variations in said exciting voltage, said secondary winding means linking said cores substantially equally and differentially, said regulator including a resonating winding means on one of said cores only and a condenser connected thereacross.

20. In an alternating electromagnetic apparatus, a pair of magnetic core means comprising dissimilar core materials having dynamic B–H curves differing in magnitude and phase characteristics, said apparatus comprising input circuit means adapted to be connected to an alternating signal source and comprising magnetic intensity applying means arranged to provide correlated magnetization of said core means in accordance with the signal, thereby employing said core means in accordance with respective dynamic phase related magnetic performance curves, ferro-resonating means comprising winding means linking at least one of said core means and condenser means connected across said winding means to alter the flux linked by said winding means, and output circuit means adapted to be connected to a load and arranged to be responsive to the difference in response comprising the difference in phasing response and the difference in B–H magnitude response of said core means to said applying means as modified by said ferro-resonating means, the nominal range of values of said signal comprising a first range and a second range continuing upwardly therefrom, said first range corresponding to a portion of said performance curves as modified by said ferro-resonating means having substantially constant difference values with rising values of said signal, and said second range corresponding to a portion of said performance curves as modified by said ferro-resonating means having falling difference values with rising values of said signal.

References Cited in the file of this patent

UNITED STATES PATENTS

| | | |
|---|---|---|
| Re. 18,855 | Flehr | June 6, 1933 |
| 2,297,673 | Stevens | Sept. 29, 1942 |

FOREIGN PATENTS

| | | |
|---|---|---|
| 607,296 | Germany | Dec. 21, 1934 |